United States Patent

Yamazaki et al.

(10) Patent No.: US 6,887,415 B2
(45) Date of Patent: May 3, 2005

(54) PRODUCTION METHOD OF CELLULOSE FILM, CELLULOSE FILM, PROTECTIVE FILM FOR POLARIZING PLATE, OPTICAL FUNCTIONAL FILM, POLARIZING PLATE, AND LIQUID CRYSTAL DISPLAY

(75) Inventors: Hidekazu Yamazaki, Minami-Ashigara (JP); Toshikazu Nakamura, Minami-Ashigara (JP); Hiroshi Miyachi, Minami-Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 1 day.

(21) Appl. No.: 10/385,857

(22) Filed: Mar. 12, 2003

(65) Prior Publication Data

US 2003/0173703 A1 Sep. 18, 2003

(30) Foreign Application Priority Data

Mar. 12, 2002 (JP) .................................. 2002-067086

(51) Int. Cl.$^7$ ............................................... B29D 7/00
(52) U.S. Cl. ................................................ 264/217
(58) Field of Search ............................ 264/207, 217, 264/200

(56) References Cited

U.S. PATENT DOCUMENTS 5,152,947 A * 10/1992 Takeda et al. ............... 264/217
5,393,476 A * 2/1995 Suzuki ........................ 264/169
5,663,310 A * 9/1997 Shimoda et al. ............... 536/69
6,320,042 B1 * 11/2001 Michihata et al. ............ 536/69
2003/0155558 A1 * 8/2003 Yamazaki .................... 252/585
2003/0224113 A1 * 12/2003 Nakamura ................. 427/372.2

FOREIGN PATENT DOCUMENTS

JP           04275192         * 9/1992

* cited by examiner

*Primary Examiner*—Mark Eashoo
(74) *Attorney, Agent, or Firm*—Young & Thompson

(57) ABSTRACT

A production method of cellulose film wherein cellulose film is produced by preparing a polymer solution through dissolving cellulose ester in a solvent containing a prescribed organic solvent as the main component, forming a filmy object from the prepared polymer solution, and evaporating the solvent in the filmy object; the residual amount of the organic solvent is reduced while the film quality is not degraded, and the production efficiency is degraded to a least possible extent; a poor solvent, highest in boiling point among the materials contained in the solvent, is added in the content ranging from 0.1 wt % to 1.0 wt %, taking the total amount of the solvent in the prepared polymer solution to be 100 wt %; and the solubility of cellulose ester in the poor solvent is inferior to the solubility of the cellulose ester in the organic solvent which is the main component of the solvent.

13 Claims, 2 Drawing Sheets

PRODUCTION METHOD OF CELLULOSE FILM, CELLULOSE FILM, PROTECTIVE FILM FOR POLARIZING PLATE, OPTICAL FUNCTIONAL FILM, POLARIZING PLATE, AND LIQUID CRYSTAL DISPLAY

BACKGROUND OF THE INVENTION

1. Field of the Invention

The present invention relates to a production method of cellulose film in which cellulose film is produced by preparing a polymer solution through dissolving cellulose ester in a solvent containing a prescribed organic solvent as the main component, forming a filmy object from the prepared polymer solution, and evaporating the solvent in the filmy object, and a cellulose film thus produced; and protective film for polarizing plate, optical functional film, polarizing plate, and liquid crystal displays produced by the above described production method of cellulose film.

2. Description of the Related Art

Conventionally, cellulose film is used as optical materials for optical functional films for use in widening the viewing angle and preventing glare; protective films for the polarizing plates in liquid crystal displays; and the like. The cellulose films used for such optical materials are produced by means of the solution method for forming film. In the solution method for forming film, a filmy object is formed from a polymer solution in which cellulose ester or the like is dissolved in an organic solvent, the filmy object formed is heated to evaporate the organic solvent in the filmy object, and a polymer film is thereby obtained. In this connection, when the organic solvent remains in the produced cellulose film, there occur adverse effects on the dimensional stability of the film, or the coloring of the film is degraded. Accordingly, the control of the residual amount of the organic solvent in the produced cellulose film has heretofore been performed from the viewpoint of the quality. The produced cellulose film is subjected to saponification and the like in post-processes, and subsequently is commercialized as optical functional film, or protective film for polarizing plate.

Now, when the cellulose film produced by the solution method for forming film is considered from the standpoint of the environment conservation, nowadays considered to be important, there is concern that, with the level of the residual amount of the organic solvent as controlled from the viewpoint of the quality, a slight amount of the organic solvent is evaporated from the produced film in the post-processes subsequent to the film production.

However, as for the residual amount of the organic solvent, investigation has hitherto been performed from the viewpoint of the quality, but no investigation has been performed from the viewpoint of the environment conservation, and hence it is not clear how far the level of the residual amount of the organic solvent should be lowered so that the effects on the environment substantially vanish.

Additionally, in order to reduce the residual amount of the organic solvent, the following treatments are suggested: the heating period of time is extended in the evaporation process, the heating temperature is raised, and the amount of the organic solvent is reduced in relation to the amount of cellulose ester. However, in the current solution method for forming film, the production efficiency is improved while the quality of the film being maintained at a high level, and hence a variety of measures are adopted for shortening the time required for the evaporation process as much as possible; these measures include the following measures in which the amount of the organic solvent is decreased to a level as low as possible in relation to the amount of cellulose ester, and the heating temperature is raised to a level below which cellulose ester is not thermally decomposed. Consequently, it is anticipated that not only the quality of the film is degraded, but also the production efficiency is remarkably degraded, owing to extending of the heating time in the evaporation process, raising the heating temperature, and reducing the amount of the organic solvent in relation to the amount of cellulose ester, for the purpose of reducing the residual amount of the organic solvent.

SUMMARY OF THE INVENTION

The present invention, in view of the above circumstances, takes as its object the provision of a production method of cellulose film which can reduce the residual amount of the organic solvent, without degrading the film quality, and with degrading the production efficiency to the least possible extent; a cellulose film which substantially has little effects on the environment due to the residual organic solvent; and protective film for polarizing plate, optical functional film, polarizing plate, and a liquid crystal display produced by the above described production method of cellulose film.

The production method of cellulose film of the present invention, which achieves the above described object, is a production method of cellulose film which method produces cellulose film by preparing a polymer solution through dissolving cellulose ester in a solvent having a prescribed organic solvent as the main component, forming a filmy object from the prepared polymer solution, and evaporating the solvent in the filmy object; and wherein:

the polymer solution is prepared by adding a poor solvent, having the highest boiling point among the materials contained in the solvent, so as to have the content of 0.1 to 1.0 wt % where the total amount of the solvent in the prepared polymer solution is taken as 100 wt %; and the solubility of cellulose ester in the poor solvent is inferior to the solubility of cellulose ester in the organic solvent which is the main component of the solvent.

The addition amount of the poor solvent is very small, so that the addition of the poor solvent scarcely degrades the production efficiency of the cellulose film. Additionally, since the poor solvent is highest in boiling point among the materials contained in the solvent, it is most difficult to be evaporated and tends to remain. Furthermore, since the solubility of cellulose ester in the poor solvent is inferior to the solubility of cellulose ester in the organic solvent which is the main component of the solvent, the intermolecular bond between the poor solvent and the cellulose ester is difficult to be formed as compared to the intermolecular bond between the main-component organic solvent and the cellulose ester. In the solvent during the evaporation process, the action of the remaining poor solvent prevents the formation of the intermolecular bond between the main-component organic solvent and cellulose ester, and the evaporation of the main-component organic solvent is thereby promoted. Additionally, the remaining poor solvent hardly forms the intermolecular bond with cellulose ester so that cellulose ester is scarcely restrained by cellulose ester, and the addition amount of the poor solvent is very small; hence the poor solvent is evaporated at the end of the evaporation process, and the added poor solvent does not affect the film characteristics.

Additionally, in the production method of cellulose film of the present invention, the main-component organic solvent is dichloromethane, and it is preferable that the polymer solution is prepared by adding an alcohol having one to two carbon atoms in addition to the poor solvent.

The compatibility of dichloromethane with cellulose ester is satisfactory, and hence adoption of dichloromethane as the main component of the solvent leads to reduction of the total amount of the solvent in relation to the amount of cellulose ester. Additionally, addition of alcohols having 1 to 2 carbon atoms improves the dimensional stability (self-supporting property) of the filmy object, making the transportation of the film-like material be convenient.

Furthermore, in the production method of cellulose film of the present invention, taking the total amount of the solvent in the prepared polymer solution to be 100 wt %, it is preferable to prepare the polymer solution in such a way that dichloromethane is added in a content of 70 to 99 wt %, and simultaneously an alcohol having 1 to 2 carbon atoms is added in a content of 0.9 to 29.0 wt %.

Additionally, in the production method of cellulose film of the present invention, it is preferable that the poor solvent is an alcohol having the boiling point in the range from 80 to 170° C.

The boiling point of dichloromethane, the main solvent component of the solvent, is about 40° C.; accordingly, when the boiling point of the added alcohol is 80° C. or above, the alcohol remains in the solvent during the evaporation process, preventing without fail the intermolecular bonding formation of dichloromethane with cellulose ester. On the other hand, when the boiling point of the added alcohol is chosen to be 170° C. or below, the alcohol can be evaporated in the final stage of the evaporation process without causing the thermal decomposition of cellulose ester.

In this connection, in the production method of cellulose film of the present invention, when the mixing of the poor solvent is performed in an in-line mode, a static mixer may be used in the piping for addition and mixing; or at least two or more kinds of polymer solutions may be subjected to simultaneous flow casting or successive flow casting.

Additionally, in the production method of cellulose film of the present invention, it is also preferable that the polymer solution of cellulose ester film has the solid content ranging from 15 to 30 wt %.

Additionally, in the production method of cellulose film of the present invention, it is also preferable that the material containing the cellulose acetate synthesized from wood pulp as the main component is used as cellulose ester.

As cellulose ester, the cellulose acetate synthesized from cotton linter is known, in addition to the cellulose acetate synthesized from wood pulp; however, adoption of the cellulose acetate synthesized from wood pulp as the main component makes it possible to reduce the costs for cellulose film.

Additionally, in the production method of cellulose film of the present invention, it is preferable that the film is made to be swollen and then dried on the way of the drying process thereof, or after drying, during the film formation process by flow casting of the polymer solution of cellulose ester.

As above, through swelling once the filmy object, while the solvent being evaporated from the filmy object, or after the solvent has been evaporated, even when the molecules composing the solvent form the intermolecular bond with cellulose ester, the intermolecular bond can be broken; namely, the evaporation of the solvent can be further promoted by swelling once the filmy object and then evaporating the solvent therein again.

In this connection, it is preferable that for the purpose of swelling once the film (filmy object), the film may be swollen with water, a solvent may be applied onto the film, or exposure to a solvent gas may be performed. Incidentally, it is preferable that an alcohol-based substance (for example, an alcohol having 1 to 2 carbon atoms, etc.) is used as the solvent to be applied and the solvent gas.

The cellulose film of the present invention, which achieves the object of the present invention, is characterized in that, in the form of the finished film product, the residual amount of dichloromethane is 0.1 wt % or less, and additionally the total residual amount of the solvent is 0.5 wt % or less.

By controlling the residual amount of dichloromethane, and the total residual amount of the solvent to the values as specified above, the effects on the environment of the residual solvent in the cellulose film having been produced can be substantially prevented.

The protective film for polarizing plate, optical functional film, polarizing plate, and liquid crystal displays, which achieve the object of the present invention, are characterized in that each thereof is produced by use of the production method of cellulose film of the present invention, or by use of the cellulose film of the present invention.

As above, the present invention can provide the production method of cellulose film in which the residual amount of the organic solvent in the film can be reduced, without degrading the film quality and with degrading the production efficiency to a least possible extent; the cellulose film which gives the substantially vanishing effects of the residual solvent on the environment; and the protective film for polarizing plate, optical functional film, polarizing plate, and a liquid crystal display, all produced by the aforementioned production method of cellulose film.

DETAILED DESCRIPTION OF THE PREFERRED EMBODIMENTS

Description will be made below on the embodiments of the present invention.

In the embodiments of the production method of cellulose film of the present invention, the cellulose film is produced by flow casting of a polymer solution onto a supporting body. The supporting bodies onto which the flow casting of the polymer solution is performed include the following two bodies, a round cylindrical drum and an endless belt. Now, with reference to FIG. 1, description is made on the production line wherein a cellulose film is produced by the flow casting of the polymer solution onto the round cylindrical drum.

Figure 1:
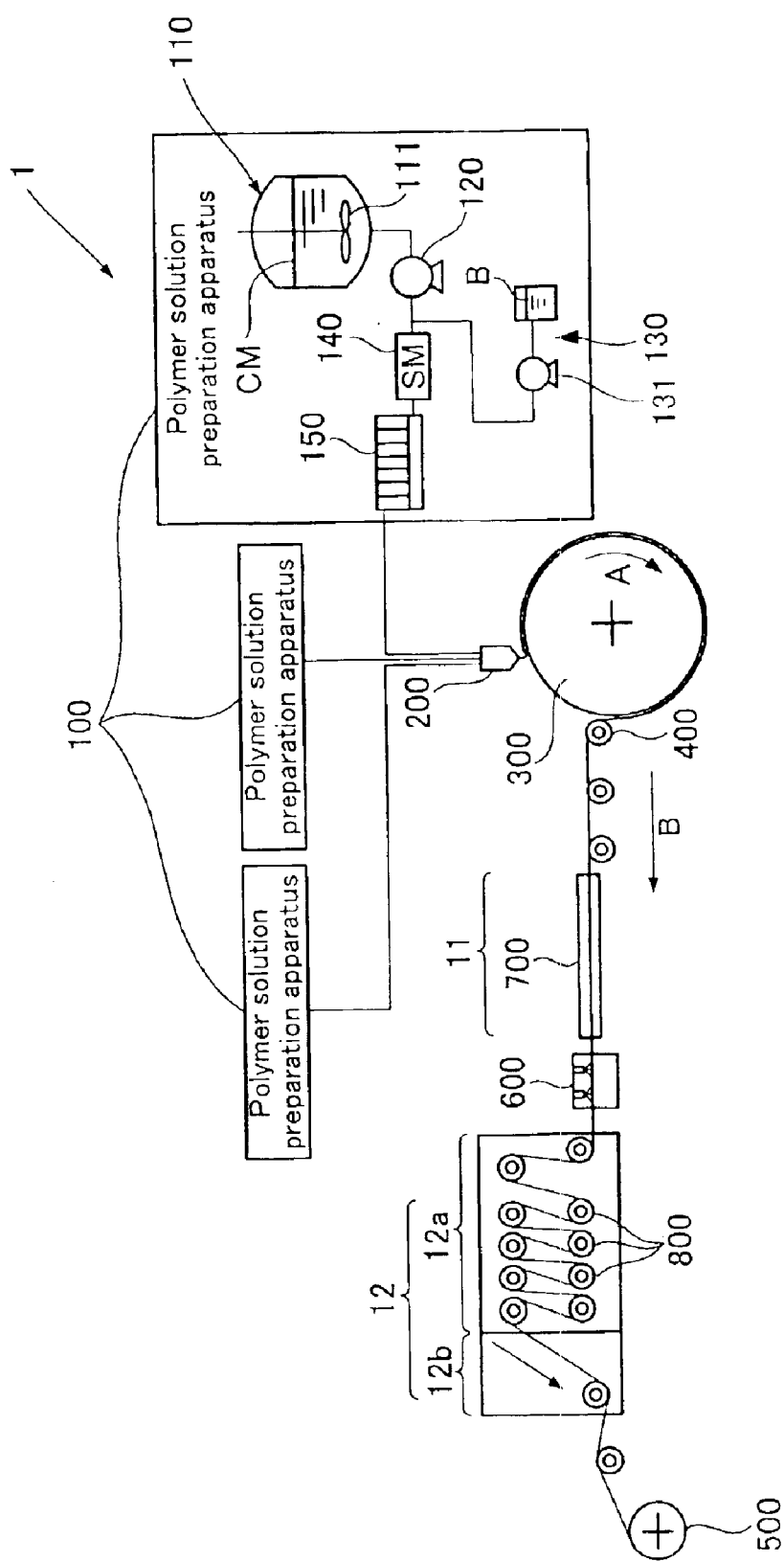
FIG. 1 is a simplified schematic view of the production line while the cellulose film is being produced by flow casting of the polymer solution onto a round cylindrical drum.

FIG. 1 is a simplified schematic view of the production line while the cellulose film is being produced by flow casting of the polymer solution onto a round cylindrical drum.

The production line 1 shown in FIG. 1 is one embodiment of the production method of cellulose film of the present invention, namely, a production line of TAC (triacetyl cellulose) film; from the upstream side of the production line 1 in order, there are arranged a polymer solution preparation apparatus 100, a flow casting die 200, a flow casting drum 300, and a peeling roll 400.

In the production line 1, there are arranged three polymer solution preparation apparatuses 100, each preparing a different type of polymer solution. Here, as an example, description will be made on the polymer solution preparation apparatus 100 shown on the right in FIG. 1. The polymer solution preparation apparatus 100 prepares the polymer solution of triacetyl cellulose. In preparation of the polymer solution, triacetyl cellulose is dissolved in a solvent containing dichloromethane as the main component, and a small amount of n-butanol is added to the solution in which triacetyl cellulose is dissolved. n-Butanol is higher in boiling point than dichloromethane. Additionally, the solubility of triacetyl cellulose in n-butanol is inferior to the solubility of triacetyl cellulose in dichloromethane. The polymer solution preparation apparatus 100 comprises a storage tank 110, a liquid delivery pump 120, a poor solvent supply device 130, a static mixer 140, and a filter 150. In the storage tank 110, a mixed solution CM of dichloromethane and methanol wherein triacetyl cellulose is dissolved is stored while being stirred by stirring blades 111. The solution CM stored in the storage tank 110 is delivered to a flow casting die 200 by the liquid delivery pump 120; the static mixer 140 and the filter 150 are arranged in some midway points along the liquid delivery path. Additionally, the poor solvent supply device 130 supplies n-butanol B to the static mixer 140 under favor of a liquid delivery pump 131. In the static mixer 140, n-butanol B is added to and mixed with the mixed solution CM. The addition amount of n-butanol is so small that the adding and mixing of n-butanol little degrades the production efficiency of the TAC film. Incidentally, instead of using the poor solvent supply device 130, n-butanol may be added to and mixed in the storage tank 110. The filter 150 removes, from the solution delivered from the static mixer 140, foreign objects, undissolved raw materials, etc., and then the solution is delivered to a flow casting die 200.

In the flow casting die 200, the polymer solutions prepared respectively in the three polymer solution preparation apparatuses 100 are supplied. More specifically, from the polymer solution preparation apparatus 100 depicted at the right of FIG. 1, of the three polymer solution preparation apparatuses, the polymer solution constituting the film surface layer is delivered; from the polymer solution preparation apparatus 100 depicted at the center, the polymer solution constituting the film central part is delivered; and from the polymer solution preparation apparatus 100 depicted on the left, the polymer solution constituting the film back surface layer is delivered. The respective delivered polymer solutions are discharged from the outlet of the flow casting die 200. Incidentally, the number of the polymer solution preparation apparatuses 100 is not necessarily limited to 3, but it may be one, two, or more than three depending on the specification of the produced cellulose film.

The flow casting drum 300 is revolved along the direction of the arrow A. The flow casting die 200 is arranged above the flow casting drum 300 in such a way that the outlet faces onto the circumferential surface of the flow casting drum 300.

The respective polymer solutions discharged from the outlet of the flow casting die 200 are subjected to simultaneous flow casting onto the circumferential surface of the flow casting drum 300 rotating along the direction of the arrow A. The polymer solutions discharged onto the circumferential surface of the flow casting drum 300, during about three-quarter revolution along the direction of the arrow A, is water-cooled from the inside of the flow casting drum 300 and simultaneously air-cooled from the outside by blasting cooling air, and accordingly the gelation is promoted to form a filmy object having self-supporting property. Subsequently, the filmy object reaches the position, where a peeling roll 400 is installed, to be peeled off.

A winding device 500 is arranged at the downstream end of the production line 1 shown in FIG. 1. A soft film drying zone 11 and a late stage drying zone 12 are arranged between the peeling roll 400 and the winding roll 500, both zones being the zones where the solvent in the filmy object is evaporated. Furthermore, a swelling device 600 is arranged between the soft film drying zone 11 and the late stage drying zone 12. The filmy object peeled off by the peeling roll 400 is delivered by two driving rolls along the direction of the arrow B, via the soft film drying zone 11→the swelling device 600→the late stage drying zone 12, and wound by the winding roll 500.

A tenter 700 is arranged in the soft film drying zone 11. The filmy object peeled off by the peeling roll 400 is delivered to the soft film drying zone 11, and passes through the interior of the tenter 700. Inside the tenter 700, the filmy object is heated, the solvent contained in the filmy object is further evaporated. The filmy object discharged from the tenter 700 is delivered to the swelling device 600. A swelling device is a device in which the filmy object delivered thereto is once made to be swollen; the swelling device 600 in FIG. 1 is a device where the solvent gas composed of ethanol is sprayed onto the filmy object being delivered. Incidentally, instead of ethanol, alcohols such as methanol and water vapor may be sprayed. The filmy object discharged from the swelling device 600 is delivered to the late stage drying zone 12. Plural rolls 800 are arranged in the late stage drying zone 12, and the filmy object is delivered while being wrapped around the plural rolls 800. The filmy object is heated in the upstream section 12a of the late stage drying device 12, and the solvent remaining in the filmy object is evaporated.

As for the n-butanol added to and mixed in the polymer solution preparation apparatus 100, it is most resistant to evaporation and tends to remain in the solvent, since n-butanol is highest in boiling point among the materials contained in the solvent. Additionally, since the solubility of triacetyl cellulose in n-butanol is inferior to the solubility of triacetyl cellulose in dichloromethane, it is more difficult to form the intermolecular bond of n-butanol with triacetyl cellulose than the intermolecular bond of dichloromethane with triacetyl cellulose. In the solvent having been added and mixed with n-butanol, the action of n-butanol breaks the intermolecular bond between dichloromethane and triacetyl cellulose, promoting the evaporation of dichloromethane. Additionally, since the remaining n-butanol does not tend to form intermolecular bond with triacetyl cellulose, it does not tend to be engaged to triacetyl cellulose, and its addition amount is small, it is evaporated by the time when the filmy object has passed the upstream section 12a of the late stage drying zone 12, so that the added n-butanol does not affect adversely the characteristics of the film. Furthermore, since in the production line 1, the solvent in the filmy object is once evaporated in the soft film drying zone 11 and is subsequently swollen by the swelling device 600, even the intermolecular bond between dichloromethane and triacetyl cellulose which remains unbroken by n-butanol can be broken. Then, in the upstream section 12a of the late stage drying zone 12, the solvents remaining in the filmy object, such as the dichloromethane broken out of triacetyl cellulose by the swelling action, is evaporated. Consequently, in the production line 1, the evaporation of the solvent in the filmy object is promoted, and the remaining amount of dichloromethane in the filmy object having passed the delivery zone 12 can be reduced to be 0.1 wt % or less, and simultaneously the total residual amount of the solvent is also reduced to be 0.5 wt % or less.

In the downstream section 12b of the late stage drying zone 12, the filmy object is cooled down to room temperature, and the filmy object (TAC film) takes the form of the finished TAC film product. The filmy object (TAC film) discharged from the late stage drying zone 12 is wound by the winding device 500. The TAC film thus produced is subsequently delivered to the subsequent processes, unshown in the figure, and is commercialized as the optical functional films such as protective film for polarizing plate and anti-glare film. Additionally, polarizing plate is formed by attaching the protective film for polarizing plate onto both sides of a polarization element made of polyvinyl alcohol etc.; and a part of a liquid crystal display is made by using the polarizing plate.

Now, with reference to FIG. 2, description will be made below on the production line wherein cellulose film is produced by flow casting of the polymer solution onto an endless belt.

Figure 2:
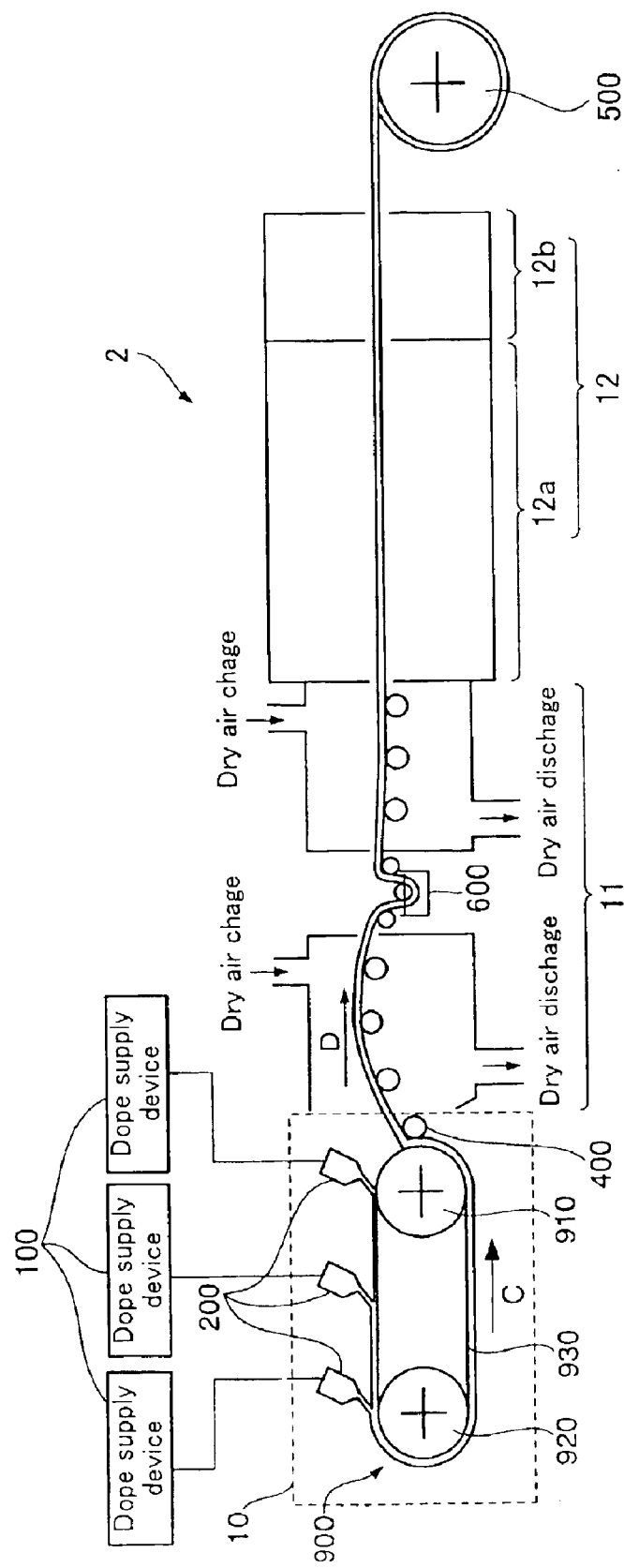
FIG. 2 is a simplified schematic view of the production line while the cellulose film is being produced by flow casting of the polymer solution onto an endless belt.

FIG. 2 is a simplified schematic view of the production line while the cellulose film is being produced by flow casting of the polymer solution onto an endless belt.

The production line 2 shown in FIG. 2 is the TAC (triacetyl cellulose) film production line which is an embodiment of the production method of cellulose film of the present invention, as the production line 1 shown in FIG. 1, wherein a flow casting band 900 is arranged instead of the flow casting drum 300 arranged in the production line 1 shown in FIG. 1. With the same reference numerals for the same constituent elements as those of the production line 1 in FIG. 1, description is made below with a focus on the points different from those in the production line 1 shown in FIG. 1.

In the production line 2 shown in FIG. 2, the three same polymer solution preparation apparatuses 100 as the three polymer solution preparation apparatuses shown in FIG. 1, and three flow casting dies 200 are arranged. The three polymer solution preparation apparatuses 100 are respectively connected to the three flow casting dies 200 in a one-to-one relation. Additionally, the three flow casting dies 200, flow casting band 900, and peeling roll 400 are arranged in a drying chamber 10.

The flow casting band 900 is formed by wrapping an endless belt 930 around a driving drum 910 and a driven drum 920. The belt 930 displaces circularly along the direction of the arrow C in the drying chamber 10. The three flow casting dies 200 are arranged along the running direction of the belt 930 and above the belt 930, with the die outlets facing onto the surface of the belt 930.

The polymer solutions delivered to the respective flow casting dies 200 are successively subjected to flow casting onto the surface of the belt 930 circularly running along the direction of the arrow C, the solvent is gradually evaporated while the belt 930 is circularly running in the drying chamber 10, and becomes a film to yield the self-supporting property. Namely, the evaporation of the solvent leads to a filmy object having shape stability. After the belt 930 has finished about one round, the filmy object is peeled off by the peeling roll 400, and delivered to the soft film drying zone 11.

In the soft film delivery zone 11 of the production line 2 shown in FIG. 2, plural rolls are arranged; the filmy object going into the soft film drying zone 11 is delivered along the direction of the arrow D, by being guided by the plural rolls. The swelling device 600 is arranged in a midway position in the soft film delivery zone 11. Incidentally, the swelling device 600 may be arranged in a midway position in the upstream section 12a of the late stage drying zone 12. The swelling device 600 shown in FIG. 2 is different from the swelling device shown in FIG. 1 in that the filmy object being delivered is watersoaked and rinsed with water. Incidentally, the application of an alcohol such as ethanol may replace the watersoaking. Both in the upstream section and in the downstream section of the swelling device 600 of the soft film drying zone 11, dry air is blasted onto the filmy object being delivered, resulting in evaporation of the solvent in the filmy object. In the upstream section 12a of the late stage drying zone 12, next to the soft film delivery zone 11, the filmy object is heated, and the solvent remaining in the filmy object is evaporated. Additionally, in the downstream section 12b of the late stage drying zone 12, the filmy object is cooled down nearly to room temperature, to take a form of the finished TAC film product. The filmy object (TAC film) discharged from the late stage drying zone 12 is wound by the winding device 500.

Now, detailed description is made below on the preparation of the polymer solution. In the polymer solution preparation performed in the polymer solution preparation apparatuses 100 as shown in FIGS. 1 and 2, at the beginning, triacetyl cellulose grains are dissolved in an organic solvent having dichloromethane as the main component, in the storage tank 110. The triacetyl cellulose is a mixture of those synthesized from wood pulp and cotton linter, wherein the content of that synthesized from wood pulp is 60 wt % and the rest of 40 wt % is allotted to that synthesized from cotton linter. As above, making that synthesized from wood pulp be the main component can reduce the cost for the TAC film. Incidentally, that synthesized from cotton linter may be completely excluded to make the whole comprise only that synthesized from wood pulp. The compatibility between the dichloromethane and triacetyl cellulose is satisfactory, and hence adopting dichloromethane as the main component of the organic solvent leads to the reduction of the total amount of the solvent in relation to the amount of triacetyl cellulose. Additionally, the organic solvent in the storage tank 110 contains methanol as a component of the mixed solvent. The addition of methanol leads to the improvement of the shape stability (self-supporting property) of the filmy object peeled off by the peeling roll 400, and the easiness in transporting the filmy object. The composition ratio between the dichloromethane and methanol is so adjusted in the storage tank 110 that dichloromethane is contained in the content of from 70 wt % to 99 wt %, and methanol is contained in the content of from 0.9 wt % to 29.0 wt %, taking the total amount of the solvent in the polymer solution prepared in the polymer solution preparation apparatus 100 to be 100 wt %. Incidentally, ethanol may replace methanol, or water may be added with modified composition ratio of methanol. Furthermore, in the organic solvent in the storage tank 110, a plasticizer, an ultra violet light absorber, an anti-deterioration agent, etc. are dissolved as additives. In the storage tank 110, the solid content such as triacetyl cellulose and the additives is adjusted so as to be from 15 to 30 wt %, taking the amount of the polymer solution prepared in the polymer solution preparation apparatus 100 to be 100 wt %.

n-Butanol, a poor solvent, is so added that the content thereof falls in the range from 0.1 wt % to 1.0 wt %, taking the amount of the polymer solution prepared in the polymer solution preparation apparatus 100 to be 100 wt %. Incidentally, as a poor solvent, any alcohol having the boiling point in the range from 80 to 170°, other than n-butanol, may be used. The boiling point of dichloromethane is about 40° C.; accordingly, when the boiling point of the poor solvent is 80° C. or higher, the poor solvent remains in the solvent during evaporation of the solvent, and the intermolecular bonding of dichloromethane to triacetyly cellulose is prevented without fail. On the other hand, when the boiling point of the poor solvent is 170° C. or lower, the poor solvent can be evaporated without thermally decomposing triacetyl cellulose.

As a result of the preparation described above, the solvent of the polymer solution delivered to the flow casting die 200 is composed of dichloromethane and n-butanol. Additionally, the composition ratios thereof are such that the content of dichloromethane ranges from 70 wt % to 99 wt %, the content of methanol ranges from 0.9 wt % to 29.0 wt %, and the content of n-butanol ranges from 0.1 wt % to 1.0 wt %, talking the total amount of the solvent to be 100 wt %.

Incidentally, until this point, description has been made on the production method of TAC film using the polymer solution in which triacetyl cellulose is dissolved in the solvent containing dichloromethane as the main component; however, in the production method of cellulose film of the present invention, the main solvent component may be an organic solvent such as lower fatty alcohols, and a chloride of a lower fatty hydrocarbon other than dichloromethane. Additionally, the solute may be a cellulose ester other than triacetyl cellulose. Furthermore, the added poor solvent is not limited to n-butanol, but it may be any solvent which is highest in boiling point among the materials contained in the solvent of the prepared polymer solution, and is inferior in the solubility of cellulose ester to the organic solvent which is the main component of the solvent.

EXAMPLES

Description will be made below on the TAC film production by applying the production method of cellulose film of the present invention, and the performed measurement of the residual amounts of the organic solvents, together with the comparative examples.

At the beginning, example 1 produced the TAC film by using the production line 1 shown in FIG. 1. In the preparation of the polymer solution, the triacetyl cellulose synthesized from cotton linter was not mixed; the triacetyl cellulose synthesized from wood pulp (20 parts by weight), a plasticizer (2.2 parts by weight), and an ultraviolet light absorber (0.02 parts by weight) were used; and the solvent was prepared so as to give the composition ratios specified below, for which the polymer solution prepared by the polymer solution preparation apparatus 100 was taken to be 100 wt %. Additionally, in the swelling device 600, a solvent gas composed of nitrogen gas and added methanol (methanol:nitrogen=2:8) was sprayed onto the filmy object discharged from the soft film drying zone 11, thereby swelling once the filmy object.

Example 1

Dichloromethane: 79.6 wt %
Methanol: 19.9 wt %
n-Butanol: 0.5 wt %

Additionally, in examples 2 to 4, the TAC films were produced under the same conditions as those in example 1, except that the conditions under which the filmy object discharged from the soft film drying zone 1 was once swollen, was changed to each condition specified below. In other words, the composition ratios of the polymer solutions were the same as those in example 1.

Example 2

Application of a solvent (methanol:water=1:1) in 0.5 cc/m$^2$.

Example 3

Spray of Water vapor at 120° C.

Example 4

Rinsing with water by watersoaking.

Furthermore, in example 5, the TAC film was produced under the same conditions (the composition ratios of the polymer solution, etc.) as those in example 1, except that the filmy object discharged from the soft film drying zone 11 was not once swollen.

Example 5

Between the soft film drying zone 11 and the late stage drying zone 12 shown in FIG. 1, the filmy object was not once swollen, and the filmy object discharged from the soft film drying zone 11 was delivered to the late stage drying zone 12, thereby performing the continuous drying.

Additionally, furthermore, in respective examples 6 and 7 and comparative examples 1 and 2, the TAC films were produced under the same conditions as those in example 5, except that the solvent composition ratios of the polymer solution were changed as the respective conditions specified below. In other words, in the same manner as that in Example 5, the filmy object discharged from the soft film drying zone 11 was not once swollen.

Example 6

Dichloromethane: 99.0 wt %
Methanol: 0.9 wt %
n-Butanol: 0.1 wt %

Example 7

Dichloromethane: 70.0 wt %
Methanol: 29.0 wt %
n-Butanol: 1.0 wt %

Comparative Example 1

Dichloromethane: 79.6 wt %
Methanol: 20.31 wt %
n-Butanol: 0.09 wt %

Comparative Example 2

Dichloromethane: 79.6 wt %
Methanol: 19.29 wt %
n-Butanol: 1.01 wt %

On the TAC films produced in respective examples 1 to 7 and comparative examples 1 and 2, described above, the total residual amount of the organic solvent, the residual amount of dichloromethane, and the residual amount of n-butanol were respectively measured by gas chromatography, and the results as shown in Table 1 were obtained.

Table 11

| Total residual | Residual amount of | Residual amount |
| --- | --- | --- |

|  | amount (wt %) | dichloromethane (wt %) | of n-butanol (wt %) |
|---|---|---|---|
| Example 1 [0.5 Wt %, Solvent gas] | 0.34 | 0.03 | 0.31 |
| Example 2 [0.5 Wt %, Solvent application] | 0.34 | 0.03 | 0.31 |
| Example 3 [0.5 Wt %, Water vapor] | 0.35 | 0.04 | 0.31 |
| Example 4 [0.5 Wt %, Water soaking] | 0.35 | 0.04 | 0.31 |
| Example 5 [0.5 Wt %, No swelling] | 0.37 | 0.05 | 0.32 |
| Example 6 [0.1 Wt %, No swelling] | 0.18 | 0.09 | 0.09 |
| Example 7 [1.0 Wt %, No swelling] | 0.48 | 0.04 | 0.44 |
| Comparative Example 1 [0.09 Wt %, No swelling] | 0.45 | 0.11 | 0.34 |
| Comparative Example 2 [1.01 Wt %, No swelling] | 0.51 | 0.03 | 0.48 |

Table 1 shows the total residual amount (wt %) of the organic solvent, the residual amount of dichloromethane (wt %), and the residual amount of n-butanol (wt %), in a single horizontal row, for each example or each comparative example. These three residual amounts are the residual amounts in the TAC film immediately after having been discharged from the late stage drying zone 12.

The present inventors discovered, as a result of diligent research, that in order to substantially reduce the effects on the environment ascribable to the solvent remaining in the TAC film after production, in the form of the finished TAC film product, the residual amount of dichloromethane is required to be 0.1 wt % or less, and additionally the total residual amount of the organic solvent is required to be 0.5 wt % or less. From the results shown in Table 1, for the TAC film produced in any of examples 1 to 7, the residual amount of dichloromethane is 0.1 wt % or less, and additionally the total residual amount of the organic solvent is 0.5 wt % or less. Accordingly, in the TAC film produced in any of examples, the effects of the residual solvent on the environment can substantially be suppressed. However, in the TAC film produced in comparative example 1, wherein the content of n-butanol is 0.09 wt %, the total residual amount of the organic solvent is 0.5 wt % or less, but the residual amount of dichloromethane takes a slightly higher value of 0.11 wt %. On the contrary to comparative example 1, in the TAC film produced in comparative example 2, wherein the content of n-butanol is 1.01 wt %, the residual amount of dichloromethane is 0.1 wt % or less, but the total residual amount of the organic solvent takes a slightly higher value of 0.51 wt %. As can be seen from these results, in order to produce the cellulose film which substantially vanishes the effects of the residual solvent on the environment, n-butanol has only to be added in the content range from 0.10 wt % to 1.00 wt % in the preparation process of the polymer solution, taking the total amount of the solvent in the prepared polymer solution to be 100 wt %. Turning to a comparison of example 1 with example 5, both examples being the same in the addition amount of n-butanol, the residual amount of dichloromethane remaining in the TAC film is larger in example 5 than in example 1. Such a matter is also the case in comparison of any example of examples 2 to 4 with example 5. As can be seen from these results, by swelling once the filmy object between the soft film drying zone 11 and the late stage drying zone 12, the evaporation of dichloromethane in the late stage drying zone 12 is promoted. A comparison of examples 1 and 2 with examples 3 and 4 indicates that the evaporation of dichloromethane is more promoted by swelling the filmy object with a solvent than with water. Incidentally, the peeling off operation with the peeling roll was able to be more rapidly performed in the production of the TAC film in any example than in the production of the TAC film in any comparative example.

What is claimed is:

1. A production method of cellulose film which produces cellulose film by preparing a polymer solution through dissolving cellulose ester in a solvent containing a prescribed organic solvent as the main component, forming a filmy object from the prepared polymer solution, and evaporating the solvent remaining in the filmy object; and wherein:
   the polymer solution is prepared by adding a poor solvent, which is highest in boiling point among the materials contained in the solvent, in the content of 0.1 to 1.0 wt %, where the total solvent amount contained in the prepared polymer solution is taken to be 100 wt %; and
   the solubility of cellulose ester in the poor solvent is inferior to the solubility of cellulose ester in the organic solvent which is the main component of the solvent.

2. The production method of cellulose film according to claim 1 wherein the organic solvent as the main component is dichloromethane, and the polymer solution is prepared by adding an alcohol having 1 to 2 carbon atoms in addition to the poor solvent.

3. The production method of cellulose film according to claim 2 wherein the polymer solution is prepared by adding dichloromethane in a content of 70 to 99 wt %, and simultaneously an alcohol having 1 to 2 carbon atoms in a content of 0.9 to 29.0 wt % where the total amount of the solvent in the prepared polymer solution is taken as 100 wt %.

4. The production method of cellulose film according to claim 1 wherein the poor solvent is an alcohol having the boiling point falling in the range from 80 to 170° C.

5. The production method of cellulose film according to claim 1 wherein, in the case where the poor solvent is mixed in an in-line mode, a static mixer arranged in the piping is used for adding and mixing the poor solvent.

6. The production method of cellulose film according to claim 1 wherein the solid content of the polymer solution falls in the range from 15 to 30 wt %.

7. The production method of cellulose film according to claim 1 wherein a material containing as the main component thereof the cellulose acetate synthesized from wood pulp is used as the cellulose ester.

8. The production method of cellulose film according to claim 1 wherein at least two or more kinds of polymer solutions of cellulose ester are simultaneously or successively subjected to flow casting.

9. The production method of cellulose film according to claim 8 wherein in the process of forming film by flow casting of the polymer solutions of cellulose ester, swelling the film, on the way of the drying process thereof or after drying, and dried.

10. The production method of cellulose film according to claim 8 wherein in the process of forming film by flow casting of the polymer solutions of cellulose ester, swelling the film by watersoaking the film, on the way of the drying process thereof or after drying, and dried.

11. The production method of cellulose film according to claim 8 wherein in the process of forming film by flow casting of the polymer solutions of cellulose ester, swelling the film by applying water vapor thereto, on the way of the drying process thereof or after drying, and dried.

12. The production method of cellulose film according to claim 8 wherein in the process of forming film by flow casting of the polymer solutions of cellulose ester, swelling the film by applying a solvent onto the film, on the way of the drying process thereof or after drying, and dried.

13. The production method of cellulose film according to claim 8 wherein in the process of forming film by flow casting of the polymer solutions of cellulose ester, swelling the film by applying a solvent gas thereto, on the way of the drying process thereof or after drying, and dried.

* * * * *